Figure 1:
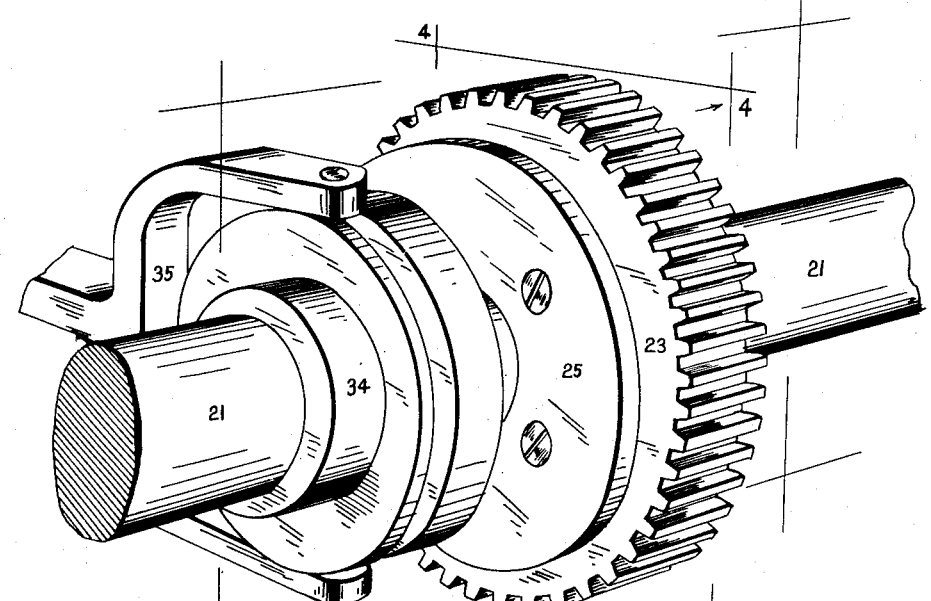

G. L. BUTLIN.
POWER TRANSMISSION GEARING.
APPLICATION FILED NOV. 8, 1907.

901,590.

Patented Oct. 20, 1908.

5 SHEETS—SHEET 1.

Witnesses
Percy Newell
M. J. Candrick

Inventor
George L. Butlin
per Fred Walsh
Attorney

G. L. BUTLIN.
POWER TRANSMISSION GEARING.
APPLICATION FILED NOV. 8, 1907.

901,590.

Patented Oct. 20, 1908.

5 SHEETS—SHEET 3.

Witnesses
Percy Newell
M. M. Candruck

Inventor
George L. Butlin
per Fred Walsh
Attorney

G. L. BUTLIN.
POWER TRANSMISSION GEARING.
APPLICATION FILED NOV. 8, 1907.

901,590.

Patented Oct. 20, 1908.

5 SHEETS—SHEET 4.

Witnesses
Percy Newell
M. Handrick

Inventor
George L. Butlin
per Fred Walsh
Attorney

G. L. BUTLIN.
POWER TRANSMISSION GEARING.
APPLICATION FILED NOV. 8, 1907.

901,590.

Patented Oct. 20, 1908.

5 SHEETS—SHEET 5.

Witnesses
Percy Newell
M J Mandrick

Inventor
George L Butlin
per Fred Walsh
Attorney

UNITED STATES PATENT OFFICE.

GEORGE LOUIS BUTLIN, OF KOGARAH, NEAR SYDNEY, NEW SOUTH WALES, AUSTRALIA, ASSIGNOR TO THE BUTLIN GEAR LIMITED, OF SYDNEY, AUSTRALIA, A COMPANY.

POWER-TRANSMISSION GEARING.

No. 901,590.     Specification of Letters Patent.     Patented Oct. 20, 1908.

Application filed November 8, 1907. Serial No. 401,520.

*To all whom it may concern:*

Be it known that I, GEORGE LOUIS BUTLIN, a subject of the King of Great Britain, residing at "Cullinga," Montgomery street, Kogarah, near Sydney, in the State of New South Wales and Commonwealth of Australia, mechanical draftsman, have invented new and useful Improvements in Power-Transmission Gearing, of which the following is a specification.

This invention refers to power transmission gearing and relates to the transmission of rotary motion from a prime mover or a driving shaft to a driven shaft whereby the power motion of the latter may be efficiently controlled. And though this invention is particularly adaptable for the transmission of engine power to the road wheels of motor vehicles yet it is equally useful in all rotary power transmission.

Devices for power transmission to perform the functions of gearing according to this invention have been suggested of many constructions and of those the most ordinary (termed clutches) have engagement between the driving and driven parts by means of frictional contact. But in contradistinction to these and for the purpose of increasing the facility and the efficiency of the engagement between the driving and driven parts— of these this improved transmission gearing has an absolute mechanical lock between said parts.

Improved power transmission gearing constructed according to this invention has in gear by frictional contact or by teeth or by bolting with the prime motor or driving shaft a driver ring or annulus. This driver ring has in its internal periphery a series of pairs of homings or sockets one or each pair opposite to the other and each pair adapted to receive the ends of a drive key or drive keys preferably two in number carried in a boss or pulley integral with the driven shaft or affixed by keying or otherwise thereto. And these drive keys have oppositely inclined ends so that each of the pair will drive. The driver ring is adapted to be loose in a journal on the said inner boss or pulley and to be engaged with said latter and revolve with it when the drive keys are forced outwardly into the sockets in said driver ring.

The drive keys are manipulated or forced outwardly into the sockets in the driver ring or withdrawn therefrom by means of sliding bars passing through them and having movement parallel with the driven shaft and having one or two faces inclined to the direction of movement. In one construction this incline is on the internal faces of the sliding bars so that its action is to withdraw the driver keys inwardly from the sockets of the driver ring and so disengage this ring from the inner boss or pulley of the driven shaft and in this case the drive keys would normally be forced upward into engagement by springs between their ends and the shaft or the inner boss at the bottom of the pockets for said drive keys. In a modified construction there are inclines on both the inner and the outer faces of the sliding bars which dispenses with the springs and gives positive engaging and disengaging action to the drive keys.

The sliding bars are actuated or given their movement parallel to the driven shaft in any approved manner but they are preferably hooked or attached to a sliding collar on the driven shaft which is operated by means of a clutch handle or other devices.

In order however to explain the carrying into practical operation of this invention the same will now be described with reference to the drawings accompanying and forming 85 part of this complete specification.

Figure 2:
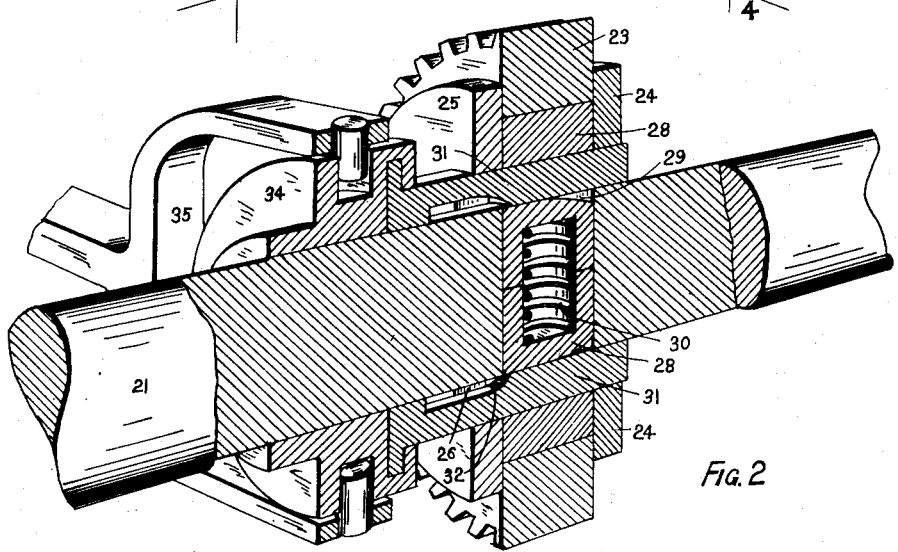
Figure 14:
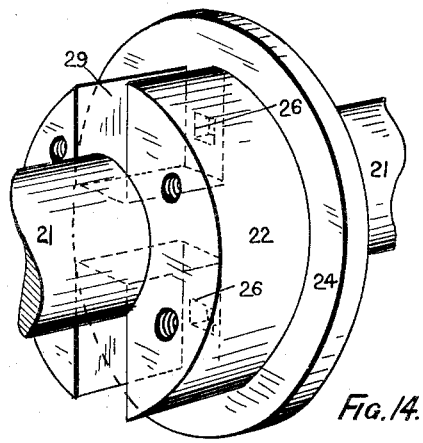
Figure 15:
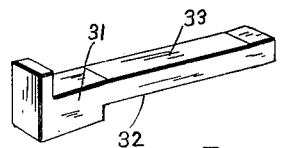

Figure 1 is a perspective view say about three quarter size of a power transmission gearing specially suitable for an automobile. Fig. 2 is a longitudinal sectional perspective view of the same with the driving and driven parts disengaged and Fig. 3 a similar view with such parts in engagement. Fig. 4 is a transverse sectional perspective view of the same on the plane 4—4 in Fig. 1 and Fig. 5 is a similar view on the plane 5—5 in Fig. 3. Figs. 6 to 9 are separate perspective views of the various parts of the gearing before assemblage into one whole. Figs. 10, 11, 12 and 13 are corresponding views to Figs. 2, 3, 4 and 5 respectively of a modified construction of this improved power transmission gearing wherein there is a positive engagement and disengagement between the driving and driven parts and Figs. 14 and 15 are details thereof.

Figure 3:
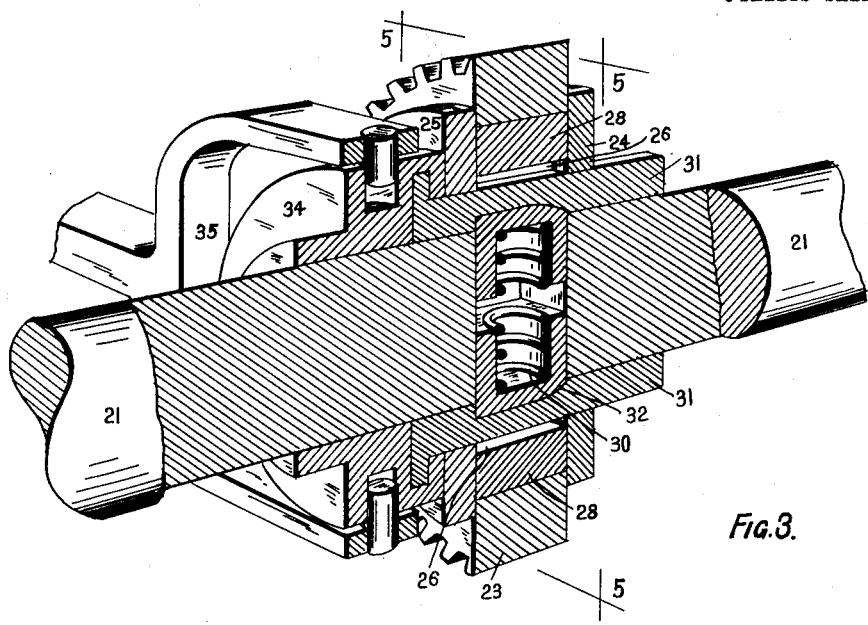
Figure 4:
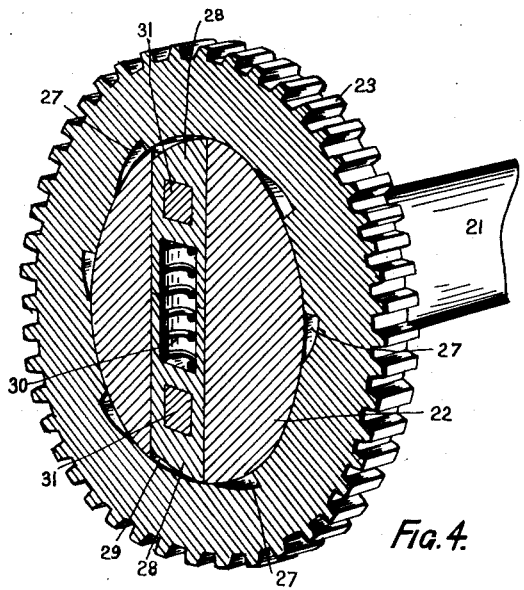
Figure 5:
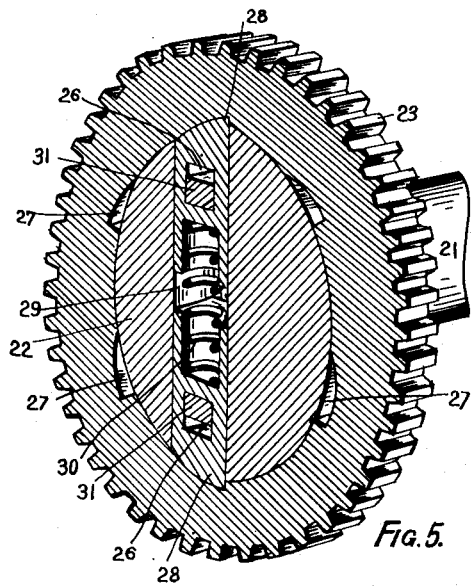
Figure 6:
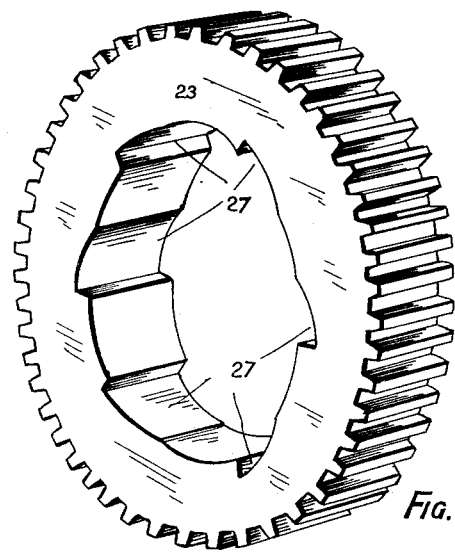
Figure 7:
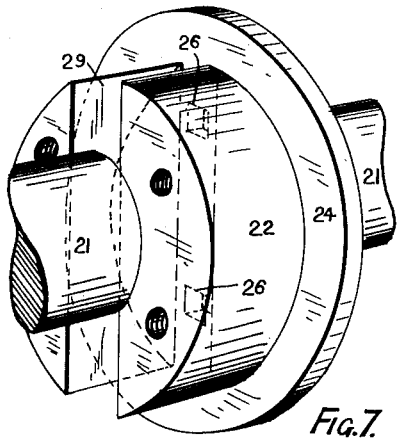
Figure 8:
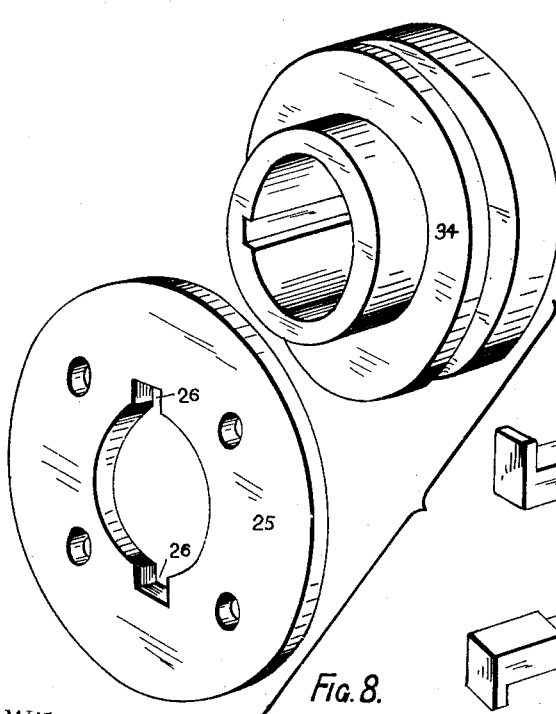
Figure 9:
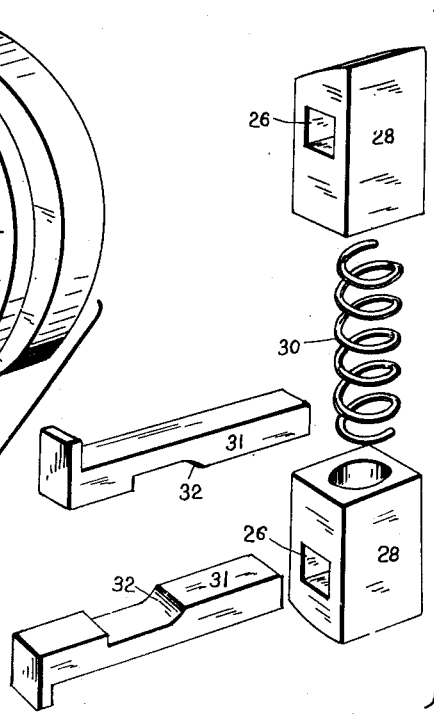
Figure 10:
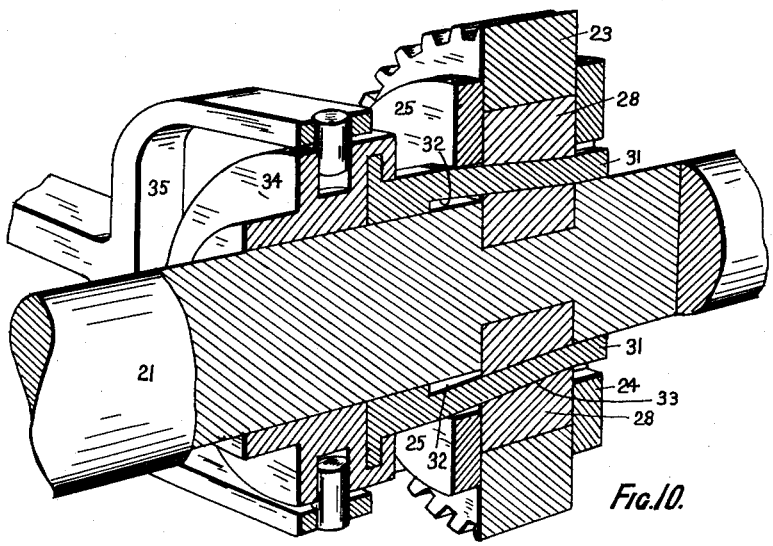
Figure 11:
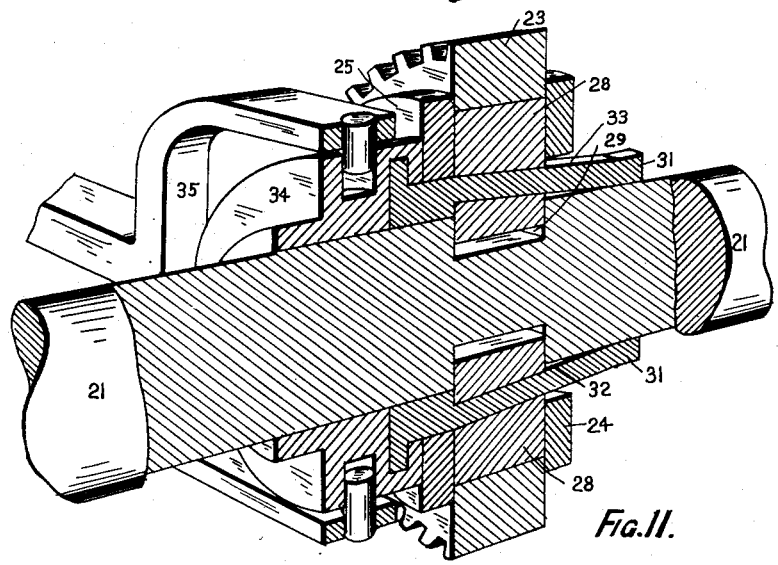
Figure 12:
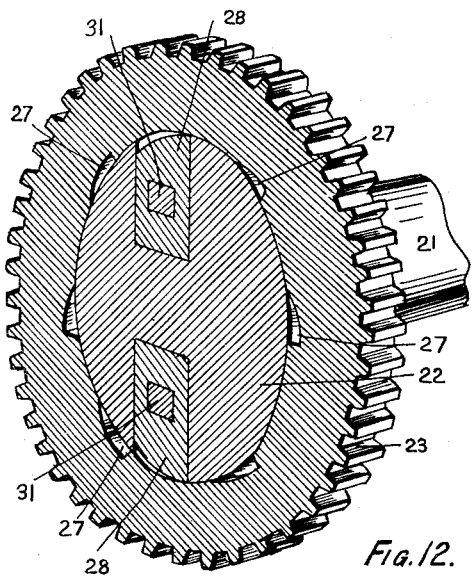
Figure 13:
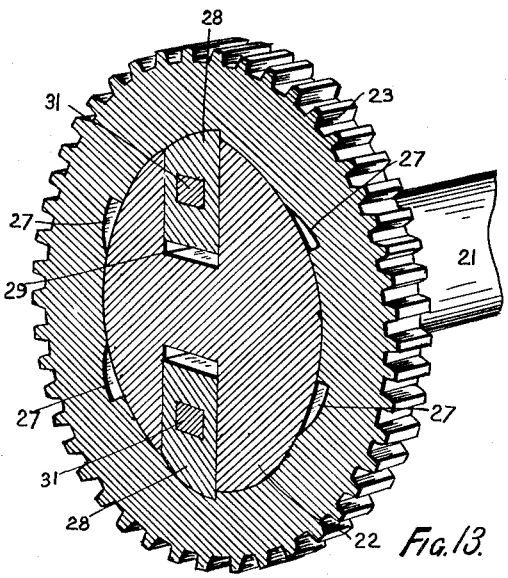

Referring to Figs. 1 to 9 the driven shaft 21 has integral therewith the inner boss 22 forming a journal on which loosely is the driver ring 23 shown as adapted to be driven from some power device by toothed gearing though of course it may be actuated otherwise. This driver ring is retained in position by flange 24 and keeper ring 25 screwed to said boss 22. In the inner periphery of the driver ring 23 are a series of pairs of homings or sockets 27 with each socket of the pairs diametrically opposite one another. If desired there may be but one such pair of sockets though for certainty and celerity of engagement a series as shown is preferable. Adapted to comfortably fit and fill the sockets 27 are a pair of drive keys 28 having outer oppositely set drive ends as shown. These drive keys 28 slidably fit the slots or passages 29 diametrically across the inner boss 22 and holding in or on their inner ends preferably pocketed for such purpose the extension helical spring 30. It will be seen that if the spring 30 is free to extend that as the driver ring 23 revolves the drive keys 28 will home in the sockets 27 and positively engage the boss 22 and thus positively engage the shaft 21 with said driver ring 23 and so cause said shaft 21 to be revolved. But this extension of said spring 30 is controlled as shown by the longitudinally sliding bars 31 in the slots or passages 26 in the drive keys 28 and in the keeper ring 25 and flange 24. These bars 31 have inclines or hollows 32 on their inner faces and when these inclines or hollows 32 are in juxtaposition with the slots or passages 29 as shown in Figs. 3 and 5 the springs 30 extend and force the drive keys 28 into the sockets 27. But when these bars 31 are slid longitudinally the inclines or hollows 32 are drawn out of juxtaposition as shown in Figs. 2 and 4 and the drive keys 28 are positively withdrawn from the sockets 27 and moving inwardly in slots 29 compress the springs 30 until positive engagement between the driving and driven parts is again required. The longitudinal movement may be given to the bars 31 in any approved manner but as shown in the drawings is attained by means of connection with sliding collar 34 on the shaft 21 and on a feather thereon which collar 34 is operated by a forked handle 35.

Referring to Figs. 10 to 15 the construction of this modified power transmission gearing is the same as that just described (and its same functional parts bear like numerals) except that the springs 30 and their pockets are dispensed with and that the sliding bars 31 have not only an incline or hollow on their inner face but also an incline or ramp 33 on their outer faces. The longitudinal movement of said bars 31 by this means insures that the transverse or diametrical movement of the drive keys 28 is positive both inwardly and outwardly and thus the homing and withdrawal of said drive keys 28 in respect to the sockets 27 are also positive.

Instead of the longitudinal sliding bars to actuate the drive keys other devices to perform the function of protruding and withdrawing said drive keys might be used. For instance revolving or partially revolving bars with eccentrics in slots in the drive keys might be used or toggles or cranks or other devices operated by suitable handles.

Having now particularly described and ascertained the nature of my said invention and in what manner the same is to be performed I declare that what I claim is:—

1. In a power transmission gearing, a shaft having a diametrically slotted enlargement, a pair of drive keys radially movable therein, a spring for impelling said drive keys apart, a gear having internal notches in diametrically opposite pairs adapted to be engaged by said keys, the keys and the notches of opposite pairs having oppositely-directed engaging shoulders, and means for radially displacing said keys to engage and disengage said gear and said shaft.

2. In a power transmission gearing, a driving member having a diametrically slotted portion, a pair of radial and oppositely moving driving keys thereon, said driving keys having driving shoulders presented in opposite circumferential directions, and a gear having diametrically opposite notches with shoulders presented in circumferential opposite directions for the respective pairs, and adapted to be engaged by said keys.

3. In a power transmission gearing, a driving member having a pair of radially movable keys, means for radially displacing said keys, each key having an inclined outer surface and a driving shoulder, the driving shoulders of the respective keys being presented in opposite circumferential directions, and a driven member having diametrically opposite notches adapted to closely fit the contour of said keys, whereby said keys slip into a relation to tightly lock the driving to the driven member, notwithstanding initial differing speeds of said members.

In witness whereof, I subscribe my signature, in the presence of two witnesses.

GEORGE LOUIS BUTLIN.

Witnesses:
  H. D. JAMESON,
  A. NUTTING.